United States Patent [19]
Moldskred et al.

[11] Patent Number: 5,548,108
[45] Date of Patent: Aug. 20, 1996

[54] METHOD AND APPARATUS FOR SCANNING SYMBOLS

[75] Inventors: Walt Moldskred, Seattle; Jon R. Ramberg, Lynnwood, both of Wash.

[73] Assignee: Intermec Corporation, Everett, Wash.

[21] Appl. No.: 152,257

[22] Filed: Nov. 12, 1993

Related U.S. Application Data

[63] Continuation of Ser. No. 739,622, Aug. 2, 1991, abandoned.

[51] Int. Cl.⁶ .................................................. G06K 7/10
[52] U.S. Cl. .................................................. 235/462
[58] Field of Search ........................... 235/436, 462, 235/463, 466, 472, 375

[56] References Cited

U.S. PATENT DOCUMENTS

| | | | |
|---|---|---|---|
| 4,308,455 | 12/1981 | Bullis et al. | 235/463 |
| 4,344,152 | 8/1982 | Laurer et al. | 235/436 X |
| 4,450,349 | 5/1984 | Apitz et al. | 235/462 |
| 4,567,361 | 1/1986 | Rosenthal | 235/462 |
| 4,825,058 | 4/1989 | Poland | 235/472 |
| 4,831,610 | 5/1989 | Hoda et al. | 369/48 |
| 4,855,581 | 8/1989 | Mertel et al. | 235/462 |
| 4,879,456 | 11/1989 | Cherry et al. | 235/462 |
| 4,961,086 | 10/1990 | Takenaka | 235/462 X |
| 5,128,527 | 7/1992 | Kawai et al. | 235/462 |
| 5,144,118 | 9/1992 | Actis et al. | 235/436 X |
| 5,184,005 | 2/1993 | Ukai et al. | 235/472 |
| 5,189,289 | 2/1993 | Watanabe | 235/462 |
| 5,258,605 | 11/1993 | Metlitsky et al. | 235/462 |

FOREIGN PATENT DOCUMENTS

| | | |
|---|---|---|
| 0074485 | 3/1982 | European Pat. Off. . |
| 0067414 | 12/1982 | European Pat. Off. . |
| 0176933 | 4/1986 | European Pat. Off. . |
| 0265148 | 4/1988 | European Pat. Off. . |
| 0328773 | 8/1989 | European Pat. Off. . |
| 3306088A1 | 10/1983 | Germany . |
| 63-18481 | 1/1988 | Japan ..................... 235/436 |

OTHER PUBLICATIONS

*Reading Between the Lines, An Introduction to Bar Code Technology* Craig K. Harmon and Russ Adams, Jan. 1989, Helmers Publishing, pp. 11, 242.

*Primary Examiner*—Donald T. Hajec
*Assistant Examiner*—Mark Tremblay
*Attorney, Agent, or Firm*—Seed and Berry LLP

[57] ABSTRACT

A method and apparatus for processing the information in a sequence of bar code symbols. The information contained in one symbol can be decoded and processed while the information in the next symbol is being gathered. A pulse width counter, under control of a microprocessor, accumulates counts representing the widths of the elements of a bar code symbol and the accumulated counts are latched into a separate latch buffer which is then transferred into the microprocessor memory by a direct memory access controller. A program in the microprocessor operates on the information stored in the microprocessor memory to decode, process and output the data and/or commands contained within a given symbol as the pulse width counter is accumulating the counts that represent the next symbol to be read. If the input device is an automated scanner, the scanner's Start-of-Scan signal is used by the microprocessor to specify the beginning and end of each scan. If the input device is a wand, the microprocessor interprets an overflow of the pulse width counter as signifying the end of the wand scan.

19 Claims, 7 Drawing Sheets

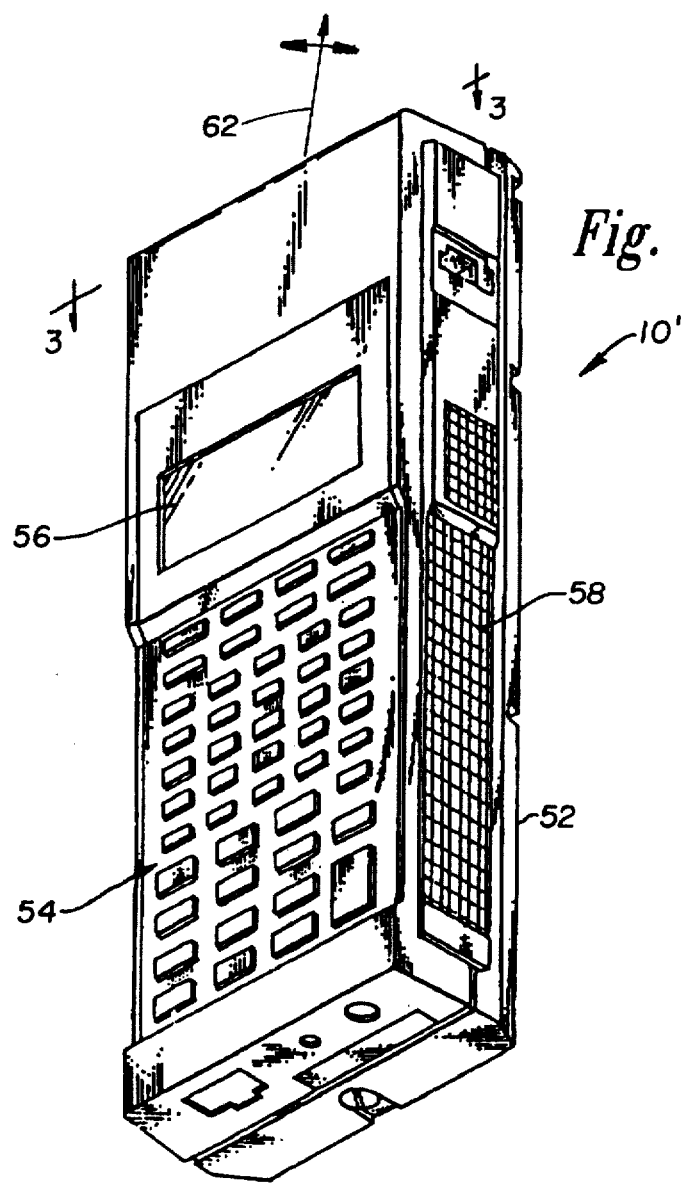
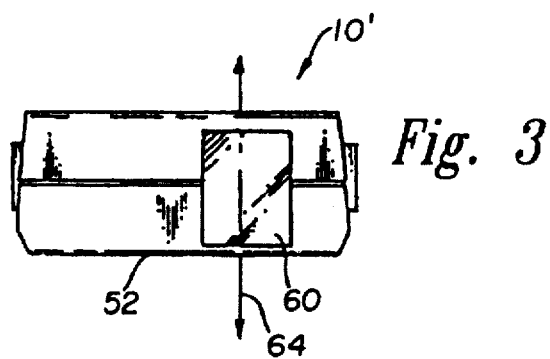

1

METHOD AND APPARATUS FOR SCANNING SYMBOLS

CROSS-REFERENCE TO RELATED APPLICATION

This application is a continuation of U.S. patent application Ser. No. 07/739,622, filed Aug. 2, 1991, now abandoned.

TECHNICAL FIELD

The present invention relates to a method and apparatus for scanning symbols and, more particularly, to a method and apparatus for processing the information contained in some symbols of a sequence while other symbols in the sequence are still being read.

BACKGROUND OF THE INVENTION

A symbology input device typically uses a sensing beam to read a symbology, such as a bar code, which consists of alternating areas ("bars") having differing characteristics to which the beam is sensitive. The bar code, or other symbology, can be used to store information or commands which are addressed to other devices. After sensing the symbology, the input device then receives and interprets the fluctuations in the returning sensing beam that are caused by the symbology. For example, it is known in the prior art to read symbology by means of a hand-held wand which makes contact with the surface on which the symbology is printed and reads the symbology by means of a beam of light. It is also known to use a non-contact scanning device to cause a beam of light to scan across an area containing a bar code. Such input devices typically transform the reflected scanning beam to an electronic form for decoding.

Decoding includes both 1) interpreting the received reflected signal as a representation of the alternating characteristics of the symbology and 2) checking the representation and producing the symbol or symbols being represented by the symbology. The decoding function is generally performed by a reader device which can include a microprocessor and associated memory devices. The memory devices are used to store the program under which the microprocessor operates and tables of data which contain the correspondence between representations and the represented symbologies.

In use, the scanning device can scan symbols faster than the symbols can be decoded and stored. In applications where a large number of symbols are read within a short period of time, the efficiency of the operation is materially degraded because the operator often must wait after a scan for the reading device to catch up, or data is lost.

SUMMARY OF THE INVENTION

It is an object of the present invention to provide a method and apparatus for scanning a plurality of symbols, wherein some of the scanned symbols are decoded before all of the plurality of symbols have been scanned.

It is another object of the present invention to provide a method and apparatus for commencing decoding of the symbols of varying contrast in a sequence before all of the plurality of symbols have been scanned.

It is still another object of the present invention to provide a method and apparatus for transmitting the data represented by a plurality of symbols of varying contrast to an output device before all of the plurality of symbols have been scanned.

In one aspect, the invention is a method for producing and storing representations of each of a plurality of symbols of varying contrast in a sequence. The method comprises the steps of (a) sequentially scanning the plurality of symbols to produce a corresponding plurality of symbol signals therefrom, (b) producing a representation of each of the symbols in the plurality of symbols from the corresponding symbol signal, and (c) before completing step (a), storing the representation of at least the first symbol in a first symbol buffer.

In another aspect, the invention is an apparatus for producing and storing representations of each of a plurality of symbols of varying contrast in a sequence. The apparatus comprises a scanner adapted to scan the plurality of symbols and produce a plurality of symbol signals corresponding to the plurality of symbols, a circuit adapted to produce a representation of each of the symbols in the plurality of symbols from the corresponding symbol signal, and a circuit adapted to store the representation of at least the first symbol in a first symbol buffer before all of the symbols in the plurality of symbols have been scanned.

BRIEF DESCRIPTION OF THE DRAWINGS

FIG. 2 is a perspective view of a transaction manager incorporating a scanning laser bar code reader embodying the present invention.

FIG. 3 is a top end view of the transaction manager shown in FIG. 2.

DETAILED DESCRIPTION OF THE INVENTION

Figure 1:
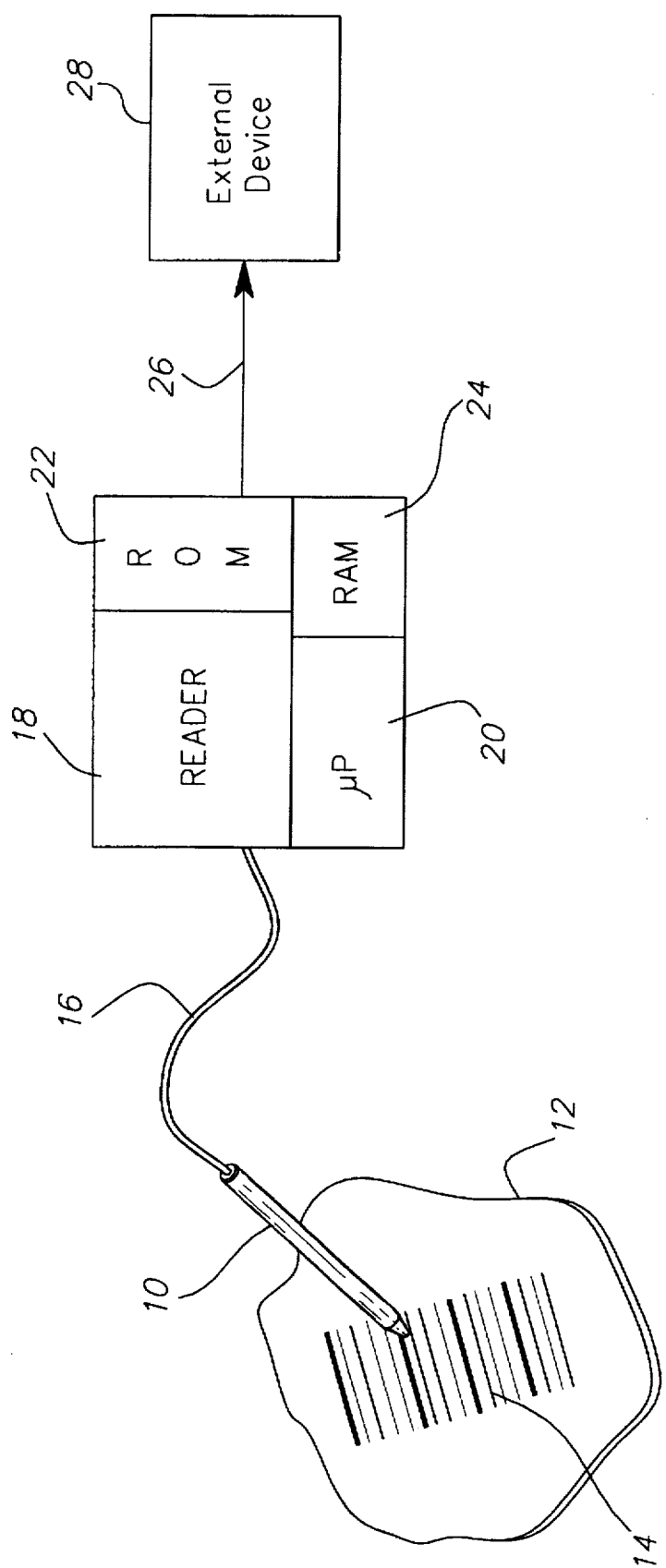
FIG. 1 is a schematic diagram of a symbology-reading system embodying the present invention.

FIG. 1 is a schematic diagram of a symbology-reading system. An input device 10, such as a handheld wand, produces a sensing beam (not shown) which is directed by the input device across an area 12 containing a symbol 14, such as a bar code. The input device 10 receives reflections of the sensing beam and produces video signals containing sequences of representations of the contrasting areas in the symbol 14. These video signals are typically compatible with transistor-transistor logic (TTL). They comprise analog signals that are composed of segments that are within a "high" band when the corresponding symbol 14 has one of two characteristics, such as being dark, and segments that are within a "low" band when the corresponding symbol 14 has the other of the two characteristics, such as being light.

The TTL video signals are transmitted through some means, such as a cable 16 or other transmission means to a reader 18. The transmission means can be a radio channel or any other suitable communications channel. The reader 18 can, for example, be a "wedge" reader which produces data for a personal computer or be built into a handheld scanner. The reader 18 typically includes electronic components, such as a microprocessor 20, which is programmed according to a program stored in a read-only memory (ROM) 22. The ROM 22 also contains tables which are used by the reader 18 in interpreting and decoding signals corresponding to the TTL signals received over the cable 16. The tables can represent a number of possible symbologies, thus allowing the system shown in FIG. 1 to be useful with several different symbologies. The reader 18 also includes a random access memory (RAM) 24 which contains the program and tables and other data when the reader is in operation.

As will be described in greater detail subsequently, through algorithms contained in the program operating in the microprocessor 20, the TTL signals on the cable 16 are first transformed to series of counts in the reader 18. Each count represents the duration of the corresponding segment of the TTL signal. These series of counts are then compared to acceptable sequences of counts, depending upon the symbology being used. Based on the results of this comparison, the reader can determine which symbology is being read, and according to that symbology, what symbol is represented by the TTL signal. The reader 18 then produces an output signal, such as an ASCII signal, that represents the symbol that has been read by the input device 10. The output signal is transmitted on a line 26 to the external device 28 for use. The line 26 can, among other things, be a cable or a radio channel and the external device a host computer, or the line 26 can be an internal signal line and the external device another microprocessor which further processes, and possibly stores, the symbol.

The input device 10 can also be a laser scanner. One embodiment of a laser scanner 10' of the type with which the invention is intended to operate is transaction manager 10' incorporating a part of the invention, shown in FIGS. 2 and 3. The laser scanner 10' contains electronic circuitry and optical components contained within a case 52. Also included is a keyboard 54 and liquid crystal display (LCD) 56 for the display of bar codes which have been read by the laser scanner 10' as well as for programming a microprocessor contained within the laser scanner 10'.

Figure 8:
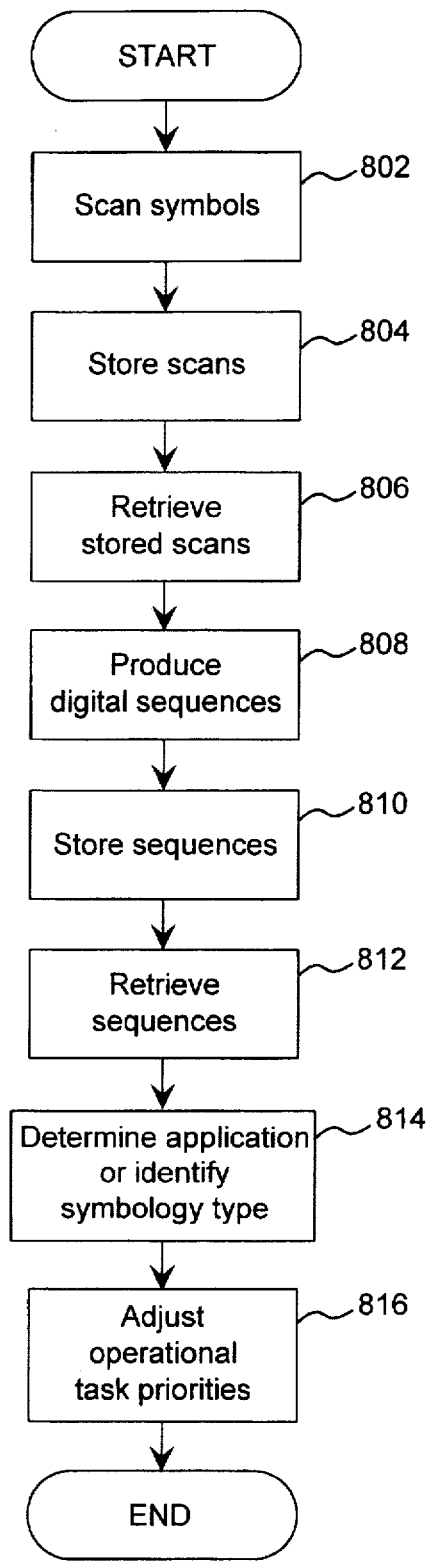
FIG. 8 is a flowchart presenting a method of processing symbols with a symbology reader according to the invention.

Upon actuating a pair of opposed triggers 58 (one shown in FIG. 2), the laser scanner 10' is activated, as will be described subsequently, to produce a scanning beam 62 of laser light. The scanning beam 62 passes through a window 60 placed in the top end of the laser scanner 10', as shown in FIG. 3. The scanning occurs in the plane 64 (shown in FIG. 3). The light from the scanning beam 62 is projected forwardly of the laser scanner 10'. If it reaches a reflecting surface, some of the impinging energy returns to the window 60. If the reflecting surface happens to contain bar code symbol which the scanning laser beam impinges upon, the returning light will be modulated by the pattern of reflectivies which the bar code symbol contains. The light received by a photodiode (not shown) in the laser scanner 10', is amplified and processed by circuitry in accordance with techniques which are described below. Each repetition of the above-described steps of scanning the beam 62 and detecting the return light is referred to herein as a "scan."(Step 802, FIG. 8.)

The wavelength of the scanning beam 62 of laser light produced within the laser scanner 10 is determined by the laser light source (not shown) which is positioned within the laser scanner. The laser light source can produce a wavelength beyond the range of human vision ("invisible") or a wavelength within the range of human vision ("visible"). If an invisible laser beam is used to read the bar code symbology, it will generally be necessary to include an auxiliary light beam to be used by the operator of the laser scanner 10' to assist the operator in placing the scanning beam 62 on the bar code symbol.

Figure 4:
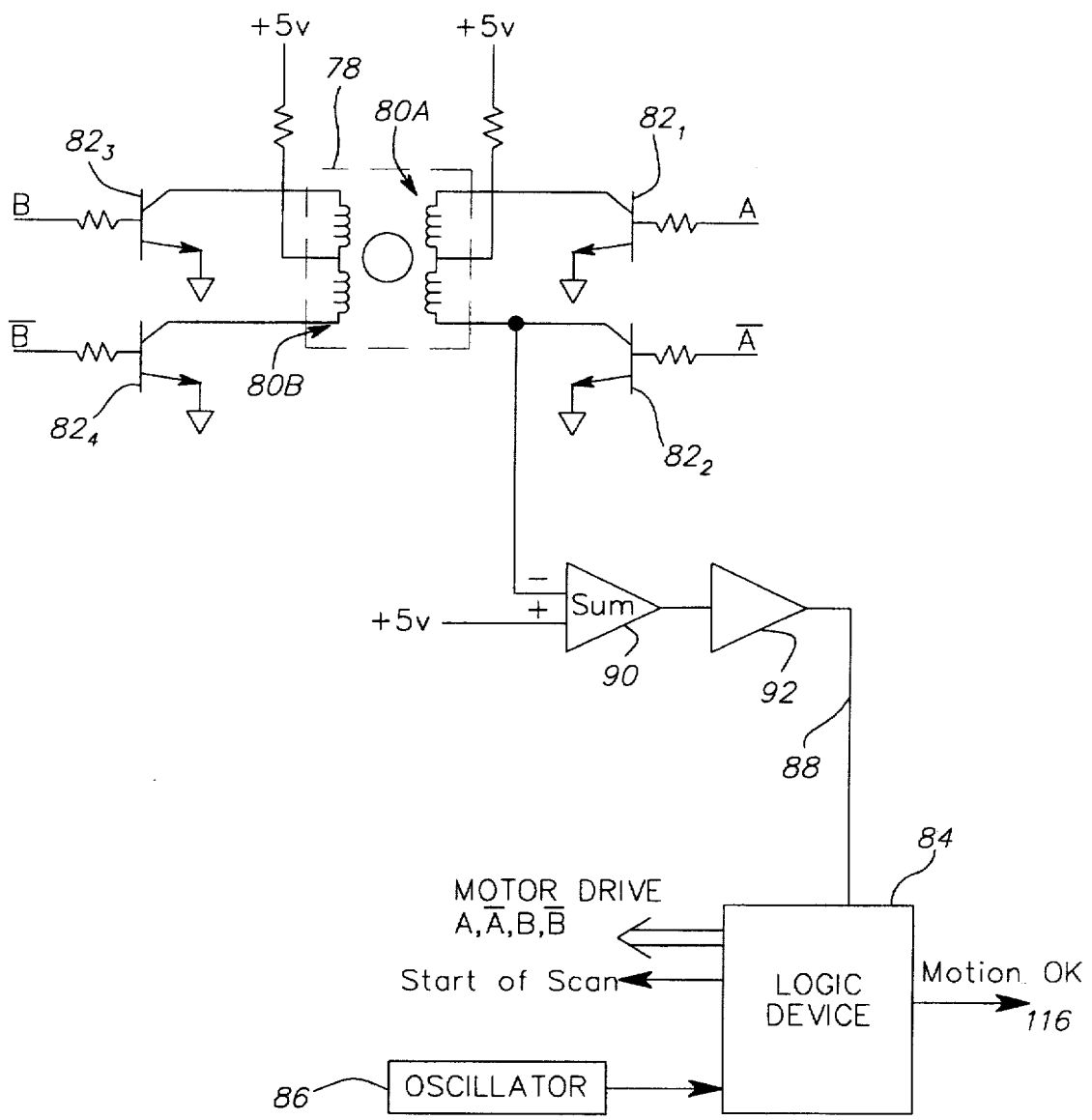
FIG. 4 is a schematic diagram of the electronic circuitry of the motor drive electronics for the transaction manager shown in FIG. 2.

FIG. 4 is a schematic diagram of the electronic circuitry of the motor drive electronics for the transaction manager shown in FIG. 2. A stepper motor 78 has, for example, the capability of producing steps which are eighteen degrees wide. The motor 78 includes two windings 80A and 80B. Each of the windings 80A and 80B is center-tapped, dividing the winding into two legs. The center of each of the windings is held at a substantially fixed first voltage, such as the supply voltage for the electronic circuit of the laser scanner 10. Typically, the supply voltage is five volts. Each of the legs of the two windings 80A and 80B can be excited separately. To accomplish this, the end of each of the legs is capable of being grounded (or held at some other voltage, if appropriate) through a circuit including one of the transistors $82_1$, $82_2$, $82_3$, and $82_4$. For example, if an appropriate signal is applied terminals A, the gate of the transistor $82_1$ will cause current to pass through the upperleg of the winding 80A. This will cause the motor 78 to rotate slightly. If signals are applied to the terminals A, Abar, B, and Bbar in the correct order, the motor 78, and consequently, an oscillating optical element 36 driven by the motor, can be caused to oscillate. This, in turn, will cause the light beam 62 to be scanned through the window 60. It will also cause the reflected light received from the direction in which the light beam 62 is being transmitted to be focused on the photodiode in the laser scanner 10'. If the signals are applied properly to the terminals A, Abar, B, and Bbar, the light beam 62 will be moved in successive passes within an angular range having two angular extremes. If desired, the motion of the light beam 62 between extremes can be made to have a substantially constant angular velocity.

The signals applied to the terminals A, Abar, B, and Bbar can be generated by an electronic logic circuit 84. Logic circuit 84 also receives a pulse train, or other appropriate signal, from an oscillator 86, as well as a motor motion detect signal.

The motor motion detect signal can be generated from one of the legs of one of the windings 80A or 80B. For example, assuming that the motor motion detect signal is generated from the lower leg of the winding 80A, a summing amplifier 90 compares the voltage on the lower leg with a reference voltage. The electromotive force voltage is produced in the lower leg of winding 80A by movement of the motor 78. Coincident with the voltage is a voltage that is induced in the leg by electromagnetic coupling. The induced voltage is produced by the voltage used to power the upper leg of the winding 80A. The resulting voltage in the leg that is being monitored for the presence of electromotive force voltages is easiest to recognize when no signal is applied to the terminal Abar. The result of this comparison is passed on to a thresholding device 92 to produce the motor motion detect signal. The absence of a motor motion detect signal under these conditions means that either the motor 78 is not moving or the wire forming the lower leg of winding 80A is broken. Assuming that the wire is not broken, the presence of a motor motion detect signal gives an indication that the motor 78 is not moving, even though appropriate signals are being applied by logic circuit 84 to the legs of its windings 80A and 80B.

Logic circuit 84 may be produced as a gate array. In response to a signal generated when the user simultaneously activates both of the triggers 58 (one being shown in FIG. 2), the logic circuit 84 generates a number of signals. Among the signals it generates are the signals required to drive the motor 78 at the terminals A, Abar, B, and Bbar, a "Start of Scan" signal, and a "Motion OK" signal. The "Start of Scan" signal is directed to other electronic circuitry in the laser scanner 10' to initialize signal processing which reads the bar code symbol (if any) as represented by the signal produced by the photodiode. If the "Motion OK" signal indicates that the motor 78 is not working, other circuitry connected to logic circuit 84 within the laser scanner 10' can cause the light source of the laser scanner 10' to be deactivated.

Figure 5:
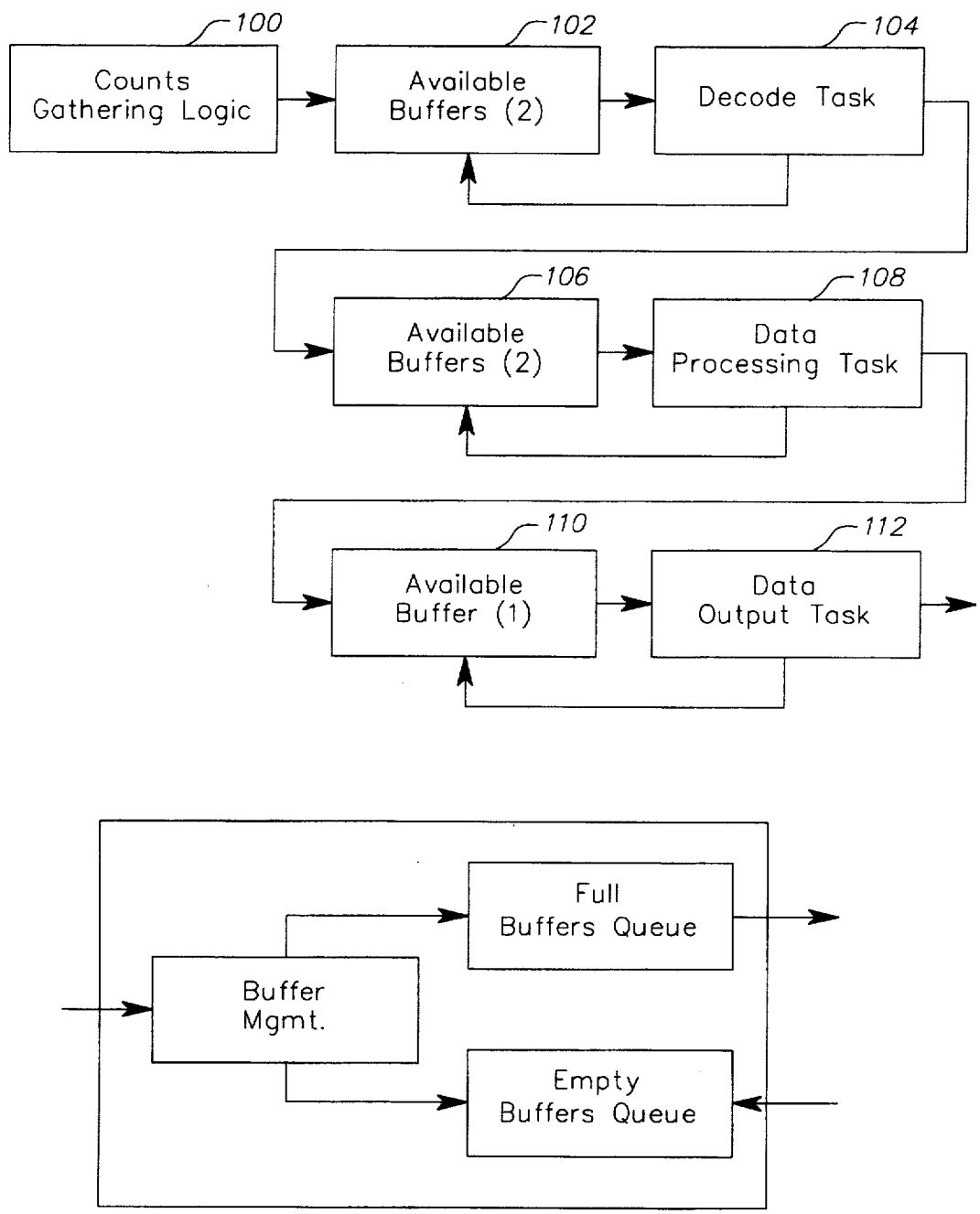
FIG. 5 is a block diagram of the operation of the present invention.

FIG. 5 is a block diagram of the operation of the present invention. The signals produced by the counts gathering logic 100 are provided to the next available buffer in a collection of symbol buffers 102. Typically, there will be two buffers available to receive the signals produced by the counts gathering logic. After a buffer in the collection of symbol buffers 102 has been filled with signals, it becomes unavailable to store further signals until the signals it stores are processed by a decode task 104.

The decode task 104 analyzes the time duration data produced by the counts gathering logic 100 and produces a representation of each of the bar code symbols in the sequence of bar code symbols that have been scanned. The representation is in the form of a sequence of time counts. The first time count represents the amount of time required for the input device 10 to traverse across the first bar in the bar code symbol. This time interval is measured in terms of a number of intervals measured by a clock. The decode task 104 compares the representation of the symbols with the various symbology formats available to determine which symbology is used to encode the information represented by the symbols. After the symbology format has been determined, the representation of each of the symbols is compared to acceptable symbols within the symbology format, to determine what information is represented by the symbols that have been scanned.

After decode task 104 has been completed, the resulting decoded representation of the first symbol is stored in one of a collection of decoded information buffers 106. After the representation has been transferred to the decoded information buffer 106, symbol 102 is made available for the next representation of a symbol produced by the counts gathering logic 100. The availability of at least two symbol buffers 102 makes it possible to begin decoding the first symbol which was scanned even while the second symbol is being scanned.

As soon as the first decoded information buffer 106 has been filled with a decoded representation of the first symbol, the data processing task 108 beings to operate. The data processing task 108 produces the information represented by the symbols. This information can take the form of data which can be transmitted to a data device or commands which can be transmitted to a command device. For example, the information can be displayed on the LCD 56 of the scanner 10' (see FIG. 2). The information produced by the data processing task 108 is transmitted to an available buffer 110. The information contained within the buffer 110 is operated on by the data output task 112. Data output task 112 produces the data represented by the original symbols in a form which is readable by an output device. As the data output task 112 completes its operation on a first symbol stored in the buffer 110, that buffer is then made available for the next symbol produced by the data processing task 108. As is described subsequently, pointer queues are produced to indicate the empty buffers that are available for storage of representations of symbols. These pointer queues are under the control of a buffer management scheme.

Figure 6:
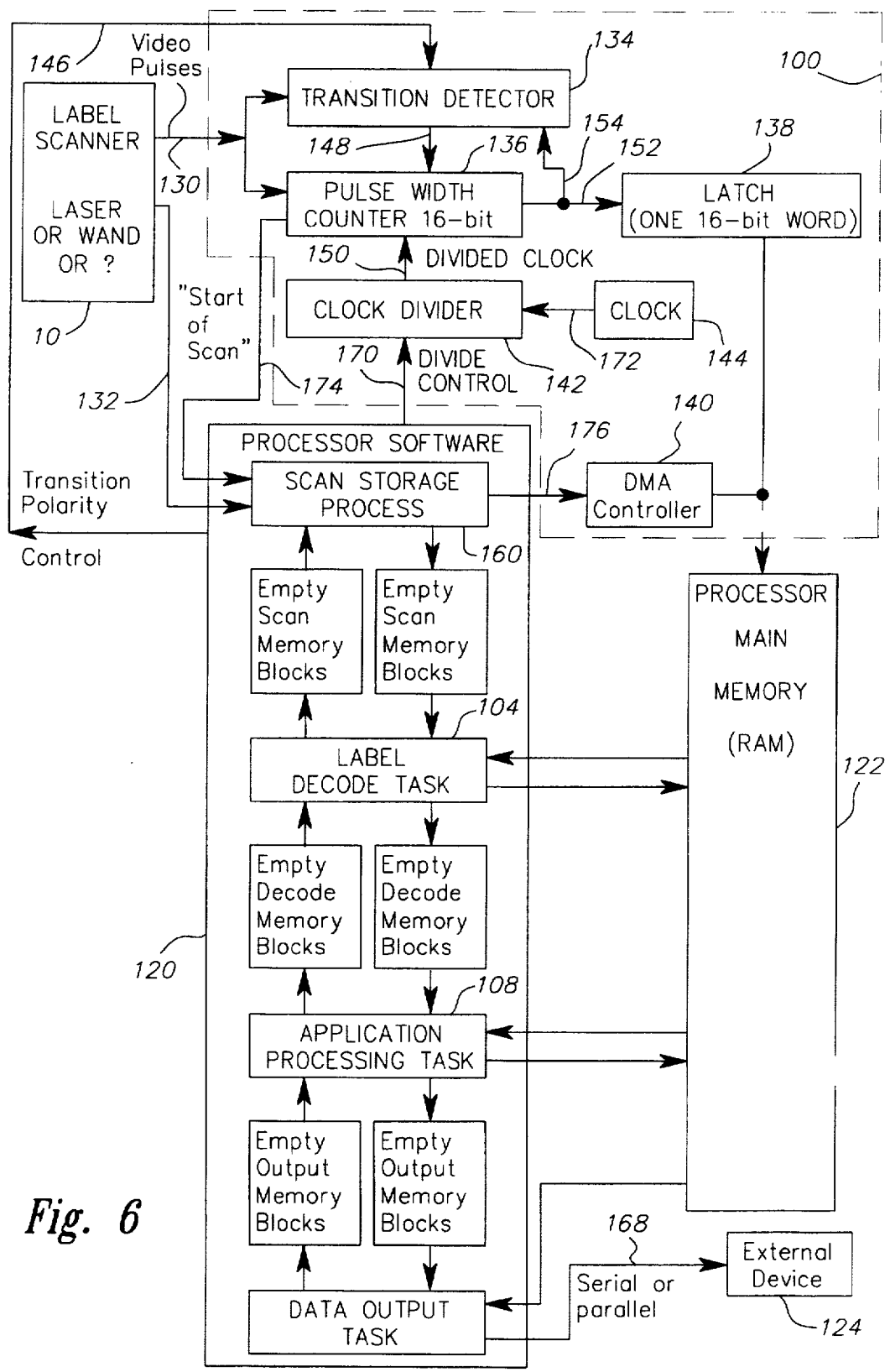
FIG. 6 is a functional block diagram of the scanning system including the present invention.

FIG. 6 is a functional block diagram of the scanning system including the present invention. The input device 10 is connected to counts gathering logic 100 which operates under the control of a microprocessor 120. The microprocessor 120 and the counts gathering logic 100 are both connected to a processor main memory 122, which is a random access memory (RAM). Further, the microprocessor 120 is connected to an external device 124. The electronic circuitry allows for software control of transition polarity to which the circuitry is responsive. It also allows for software control of a clock divide circuit. Further, the latch to be described in the electronic circuitry could be made from multiple latches in a first-in/first-out (FIFO) buffer, which is indefinitely long. This FIFO buffer is useful in circumstances where the data to be represented in symbols which are decoded are too many for the microprocessor 120 to handle within a useful time frame.

The input device 10 produces video pulses, corresponding to the variations in contrast, on an output line 130. If the input device 10 is a scanner, it will also produce a Start-of-Scan signal on a scan signal output line 132. If the input device 10 is not a scanning device, no Start-of-Scan signal is produced and no scan signal output line 132 exists.

The counts gathering logic 100 includes a transition detector 134, a pulse width counter 136, a latch 138, a direct memory access (DMA) controller 140, a clock divider 142, and a clock 144. The video pulses on the output line 130 are transmitted to both the transition detector 134 and the pulse width counter 136 (for example, a 16-bit counter). When the transition detector 134 also receives a transition polarity control signal from the microprocessor 120 on line 146, the transition detector 134 begins to scan the video pulses on the output line 130 for a transition of the proper polarity indicating a change in contrast in the symbol being scanned.

When the transition detector 134 detects the changes in contrast, it activates the pulse width counter 136 through a line 148. The pulse width counter begins to accumulate counts as it receives them from the clock divider 142 over a divided clock line 150. The pulse width counter 136 continues to accumulate counts from the clock divider 142 until the transition detector 134 detects the next transition in the video pulses on the output line 130. Upon this occurrence, the accumulated count within the pulse width counter 132 is transferred over a line 152 to the latch 138, which can store one 16-bit word (Step 804, FIG. 8). Also, the pulse-width counter 136 sends a signal to the transition detector 134 on a line 154, signifying that the pulse width counter has transferred its accumulated count to the latch 138. The pulse width counter 136 is then reset. It begins to accumulate counts until it receives the next signal from the transition detector 134 on the line 148.

The microprocessor 120 operates in accordance with a stored program. This program is shown symbolically within the rectangle representing the microprocessor 120 as a series of blocks. A scan storage process 160 in the microprocessor software also receives a signal from the pulse width counter 136, indicating that data has been transferred from the pulse width counter 136 to the latch 138. If the input device 10 is a scanning device, the scan storage process 160 also receives a Start-of-Scan signal on the scan signal output line 132. The scan storage process 160 then activates the DMA controller 140 to transfer the data kept in the latch 138 into an appropriate portion of the microprocessor memory 122 (Steps 806, 808, 810, FIG. 8). The scan storage process 160 then causes the microprocessor 120 to send a transition polarity control signal to the transition detector 134 on the line 146.

The software within the microprocessor 120 next moves to a label decode task 104 with information regarding which portions of the microprocessor memory 122 contain scan data provided by the scan storage process 160. The label decode task then operates on the sequentially next scanned information contained within the microprocessor memory 122 (Step 812, FIG. 8). It determines what symbology is being used and, according to that symbology, decodes the data contained within in the presently scanned memory block (Step 814, FIG. 8). A label decode task 104 then causes the decoded representation of the symbol to be stored in an appropriate portion of the microprocessor memory 122 and passes on to an application processing task 108.

The application processing task 108 accesses the memory block which contains a decoded representation of the first data scanned by the input device 10. The application processing task 108 further processes the information to determine whether it is data or a command, and how that data or command is represented. The application processing task 108 processes the stored representation in accordance with the particular application for which the information is to be used and stores a representation of the information contained in that decoded representation to a further block of the microprocessor memory 122 for further processing by a data output task 112.

The oldest representation of information stored in the output memory blocks of the microprocessor memory 122 is read by the data output task 112. The representation of the data is further processed and sent by the data output task 112 to the external device 124 on an output line 168.

The scan storage process 160 and the label decode task 104 jointly maintain queues of pointers. One queue points to the portions of the microprocessor memory 122 which have been filled with representations of scan data. The other queue is a list of memory blocks which have been processed by the label decode task 104 and are now eligible to contain new representations of scan data. Similarly, the label decode task 104 and the application processing task 108 maintain two queues of memory block pointers, as do the application processing task 108 and the data output task 112.

If the input device 10 is a wand, no "Start-of-Scan" signal exists. Accordingly, a completed scan is not initiated by the receipt of a signal on the scan signal output line 132, but rather a completed wand scan is detected when the pulse width counter 136 overflows after the wand has scanned the last bar of the bar code symbol. The width of the pulse width counter 136 is chosen so that it is too long to overflow if a bar code symbol is being read.

The program contained within the microprocessor 120 initially begins operation based on the assumption that the input device is a wand and, accordingly, there will be no signal present on the scan signal output line 132. However, if Start-of-Scan transitions are detected on the scan signal output line 132, the program controlling the operation of the microprocessor 120 uses these transitions to define the beginning and end of each scan (Step 802, FIG. 8). This allows the apparatus to accommodate either a wand or a laser scanner as the input device 10 without any modification to the rest of the system.

The microprocessor 120 can control the frequency of the pulses provided to the pulse width counter 136 by the clock divider 142 on the divided clock line 150. The microprocessor 120 can send a divide control signal on the divide control line 170, thereby dividing the frequency of the pulses provided by the clock 144 to the clock divider 142 over a line 172.

The current design of the electronic circuitry of FIG. 6 is intended to have the application processing task 108 be replaceable with other types of processing depending upon the application or type of symbol reader the design is to be used in the application processing task 108 will set the priorities of the other tasks (tasks 160, 104, 112, and 108). Since the application processing task 108 has the capability of setting the task priorities (Step 816, FIG. 8), it also has the capability of altering the priorities according to need. Thus, for example, if a symbology is selected to be read that is so complex as to require sufficient decoding processing time to bottleneck system throughput, then the application processing task can dynamically change the priority (Step 816, FIG. 8) of the label decode task 104 to be the highest priority task for execution, and this task would execute as long as inputs existed for it to decode. Further, if one application using this design requires more (or less) tasks than the current application, then the application processing task 108 can create the number of tasks needed. For example, to have a barcode reader than can simultaneously output to two different output devices, two data output tasks are required, instead of only one.

In addition, each task can have its buffers customized for its requirements. The buffers that store the representations of the symbols can be larger to accommodate all the raw information coming from the scanner, while the buffers storing the decoded symbols need only be large enough to accommodate the information represented by the symbol. If one task is relatively slow, then it can give the task that feeds it more buffers into which to place information so that this earlier task can continue to work with its inputs in turn, without having to wait for the slow task.

Figure 7:
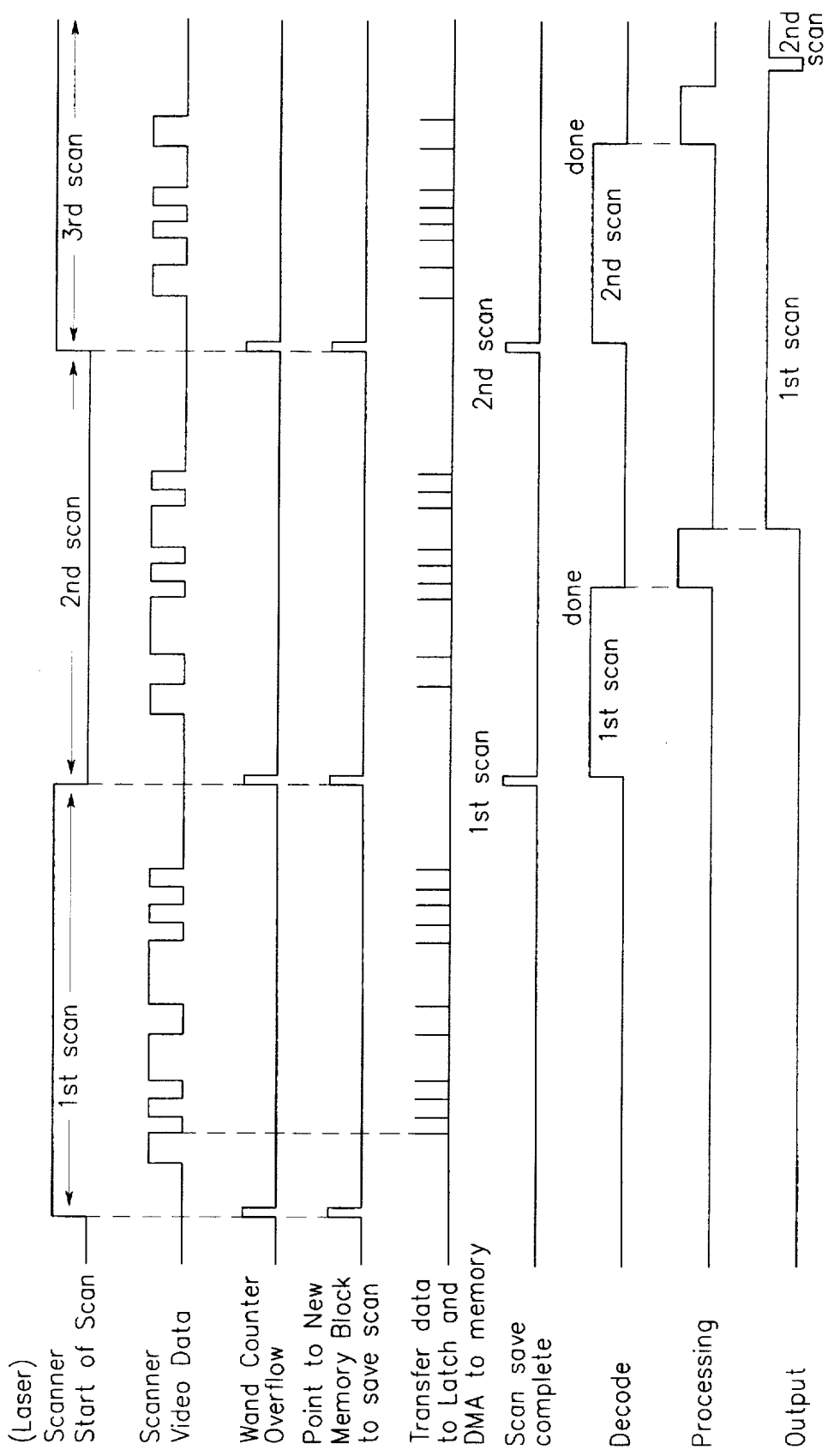
FIG. 7 is a timing diagram describing the operation of the functional block diagram of FIG. 6.

FIG. 7 is a timing diagram describing the operation of the electronic circuitry of FIG. 6. The scanner video data on the output line 130 consists of an analog signal representing the sequence of varying contrasts represented by the first symbol to scanned. If the input device 10 is a scanner, the scanner provides a Start-of-Scan signal on the scan signal output line 132. If the input device 10 is a wand, the period between scans will cause the pulse width counter 136 to overflow, producing a pulse on the line 174 from the pulse width counter 136 to the microprocessor 120 when the scan storage process 160 is being performed (see FIG. 6). The occurrence of either the scanner Start-of-Scan signal or the wand counter overflow causes the scan storage process 160 to determine the next available pointer in the empty scan memory blocks queue 180. At the end of each transition in the scanner video data, indicating the duration the video pulse just completed, the contents of the pulse width counter 136 are transferred to the latch 138 for subsequent storage to the microprocessor memory 122.

The transfer of the data from the latch 138 to the microprocessor memory 122 is accomplished under the control of the DMA controller 140, which is supervised by the microprocessor 120 over a bi-directional line 176 between the microprocessor 120 and the DMA controller 140. After the data have been transferred under control of the DMA controller 140, the DMA controller 140 sends a scan save complete signal to the microprocessor 120 on the bi-directional line 176. Completion of the scan storage process 160 with respect to the first scan data signifies the beginning of the label decode task 104 on the representations of this first scan data stored in the microprocessor memory 122. When the decode task is completed, the application processing task 108 is begun on the decoded representation of the first scan. Upon completion of the application processing task 108, the data output task 112 operates on the stored information resulting from the application processing task 108. The time required for each of the processes and tasks 160, 104, 108 and 112 can vary, depending upon the symbol being processed and the symbology being used. However, each of these tasks may be performed concurrently by the microprocessor 120 so that, for example, the data output task 112 can be operating on the results from the first scan while the label decode task 104 is operating on the results of the second scan.

It is advantageous to have a method and apparatus to begin to decode some symbols in a sequence of symbols before all of the symbols have been scanned. It is also advantageous to have a method and apparatus to decode a symbol before scanning of the same symbol is complete. What is described in the foregoing description is a method for treating representations of each of a plurality of symbols of varying contrast in a sequence. These treatments can include producing and decoding each of a plurality of symbols and storing the decoded representation, producing the information represented by a plurality of symbols, and transmitting the data represented by the plurality of symbols of varying contrast to an output device.

While the foregoing has been a discussion of a specific embodiment of the present invention, those skilled in the art will appreciate that numerous modifications to the disclosed embodiment can be made without departing from the spirit and scope of the invention. Accordingly, the invention is to be limited only by the following claims.

I claim:

1. A method of processing symbols with a symbology reader, under control of a single microprocessor within the reader, to perform a series of operational tasks with the reader, the operational tasks including reading tasks, decoding tasks, applications tasks and output tasks, the method comprising the steps of:
   (a) scanning each of a series of regions containing the symbols in a sequential order with respective scans;
   (b) storing each scan in a corresponding uniquely identified scan buffer;
   (c) retrieving selected ones of the scans from the corresponding uniquely identified scan buffers in a selected order;
   (d) producing respective digital sequences that each represent a respective one of the symbols;
   (e) storing each of the digital sequences in a corresponding uniquely identified symbol buffer in a memory.
   (f) retrieving selected ones of the selected digital sequences from the corresponding uniquely identified symbol buffers;
   (g) decoding the retrieved digital sequences to determine the symbols represented by the decoded digital sequences;
   (h) identifying an applications task represented by at least one of the determined symbols; and
   (i) dynamically changing relative priorities of the operational tasks to perform the identified applications task before other operational tasks.

2. The method of claim 1 wherein the uniquely identified scan buffers are identified by pointers and the step of retrieving selected ones of the scans from the corresponding uniquely identified scan buffers in a selected order comprises the steps of:
   selecting pointers; and
   retrieving scans from the scan buffers identified by the selected pointers.

3. The method of claim 1 wherein the uniquely identified symbol buffers are identified by pointers and the step of retrieving selected ones of the symbols from the corresponding uniquely identified symbol buffers in a selected order comprises the steps of:
   selecting pointers; and
   retrieving the symbols from the symbol buffers identified by the selected pointers.

4. A method of processing symbols with a symbology reader to perform a series of operational tasks with the reader, the operational tasks including decoding tasks, data processing tasks and output tasks, the method comprising the steps of:
   (a) scanning each of a series of regions containing the symbols in a sequential order with respective scans;
   (b) storing each scan in respective scan buffers;
   (c) retrieving selected ones of the scans from the respective scan buffers in a selected order;
   (d) producing respective digital sequences that each represent a respective one of the symbols;
   (e) storing each of the digital sequences in a corresponding uniquely identified symbol buffer in a memory;
   (f) retrieving selected ones of the selected digital sequences from the corresponding uniquely identified symbol buffers;
   (g) decoding the retrieved digital sequences;
   (h) determining the symbols represented by the decoded digital sequences;
   (i) identifying at least one operational task represented by at least one of the determined symbols;
   (j) assigning priorities to the identified at least one operational task and other operational tasks;
   (k) dynamically changing the relative priorities of the at least one operational task and the other operational tasks to establish an order of task performance in response to the identified operational task represented by the at least one of the decoded symbols; and
   (l) performing the at least one operational task and the other operational tasks according to the established order of task performance.

5. The method of claim 4 wherein the step of assigning priorities to the identified at least one operational task and other operational tasks comprises the step of allocating reader resources to the identified at least one operational task and other operational tasks.

6. The method of claim 5 wherein the step of allocating reader resources to the at least one operational task and other operational tasks comprises varying the relative sizes or numbers of buffers assigned to the identified at least one operational task.

7. The method of processing symbols with a symbology reader, under control of a single microprocessor within the reader, of claim 4 wherein the identified operational task is the decode task.

8. A method of processing symbols with a symbology reader, under control of a single microprocessor within the reader, to perform a series of operational tasks with the reader, the operational tasks including reading tasks, decoding tasks, applications tasks and output tasks, the method comprising the steps of:
   (a) scanning each of a series of regions containing the symbols in a sequential order with respective scans;

(b) storing each scan in a corresponding uniquely identified scan buffer;

(c) retrieving selected ones of the scans from the corresponding uniquely identified scan buffers in a selected order;

(d) producing respective digital sequences that each represent a respective one of the symbols;

(e) storing each of the digital sequences in a corresponding uniquely identified symbol buffer in a memory;

(f) retrieving selected ones of the selected digital sequences from the corresponding uniquely identified symbol buffers;

(g) decoding the retrieved digital sequences;

(h) determine a symbology type of at least one of the decoded symbols, and;

(i) in response to the determined symbology type, establishing relative priorities of the operational tasks, including the reading tasks, decoding tasks, applications tasks and output tasks.

9. The method of claim 8 wherein the uniquely identified scan buffers are identified by pointers and the step of retrieving selected ones of the scans from the corresponding uniquely identified scan buffers in a selected order comprises the steps of:

selecting pointers; and retrieving the scans from the scan buffers identified by the selected pointers.

10. The method of claim 8 wherein the uniquely identified symbol buffers are identified by pointers and the step of retrieving selected ones of the symbols from the corresponding uniquely identified symbol buffers in a selected order comprises the steps of:

selecting pointers; and retrieving the symbols from the symbol buffers identified by the pointers.

11. The method of claim 8 wherein the step of in response to the determined symbology type, establishing relative priorities of the operational tasks, including the reading tasks, decoding tasks, applications tasks and output tasks comprises the step of allocating reader resources to the operational tasks.

12. The method of claim 11 wherein the step of allocating reader resources comprises varying the relative sizes or numbers of buffers assigned to the operational tasks.

13. A method of processing symbols with a symbology reader, under control of a single microprocessor within the reader, of claim 8 wherein the step of determining a symbology type determines that the symbology type is complex as compared to symbology types of other symbols, and wherein the step of establishing priorities establishes that the decoding tasks have a higher priority over remaining tasks.

14. The method of claim 13 wherein the step of establishing relative priorities of the operational tasks to perform the identified applications task before other operational tasks comprises the step of identifying additional scan buffers.

15. A method of processing symbols with a symbology reader, under control of a single microprocessor within the reader, to perform a series of operational tasks with the reader, the operational tasks including reading tasks, decoding tasks, applications tasks and output tasks, the method comprising the steps of:

(a) scanning each of a series of regions containing the symbols in a sequential order with respective scans;

(b) storing each scan in a unique scan buffer, (c) retrieving selected ones of the scans from the respective scan buffers in a selected order;

(d) producing respective digital sequences that each represent a respective one of the symbols;

(e) storing each of the digital sequences in a corresponding uniquely identified symbol buffer in a memory;

(f) retrieving selected ones of the selected digital sequences from the corresponding uniquely identified symbol buffers;

(g) decoding the retrieved digital sequences to determine the symbols represented by the decoded digital sequences;

(h) identifying a current applications task represented by at least one of the symbols determined from the decoded digital sequences; and (i) assigning a greater or lesser number of tasks to at least one of the operational tasks based on the identified applications task.

16. The method of processing symbols with a symbology reader, under control of a single microprocessor within the reader, of claim 15 wherein the current applications task indicates that the output task requires simultaneous output of a number of decoded digital sequences, and wherein the step of assigning a greater or lesser number of tasks assigns a number of output tasks equal to the number of decoded digital sequences to be outputted by the symbology reader.

17. A method of processing symbols with a symbology reader, under control of a single microprocessor within the reader, to perform a series of operational tasks with the reader, the operational tasks including reading tasks, decoding tasks, applications tasks and output tasks, the method comprising the steps of:

(a) providing a plurality of buffers;

(b) scanning each of a series of regions containing the symbols in a sequential order with respective scans;

(c) storing each scan in a corresponding uniquely identified scan buffer selected from a group of scan buffers in the plurality of buffers;

(d) retrieving selected ones of the scans from the corresponding uniquely identified scan buffers in a selected order;

(e) producing respective digital sequences that each represent a respective one of the symbols;

(f) storing each of the digital sequences in a corresponding uniquely identified symbol buffer selected from a group of symbol buffers in the plurality of buffers;

(g) retrieving selected ones of the selected digital sequences from the corresponding uniquely identified symbol buffers;

(h) decoding the retrieved digital sequences to determine the symbols represented by the decoded digital sequences;

(i) storing each of the decoded digital sequences in a corresponding uniquely identified decode buffer selected from a group of decode buffers in the plurality of buffers;

(j) identifying a current operational task represented by at least one of the symbols determined from the decoded digital sequences, the current operational task having a operating speed; and (k) assigning a greater or lesser number of the plurality of buffers to the groups of scan, symbol and decode buffers based on the current operational task and the operating speed of the current applications task.

18. The method of claim 17 wherein the uniquely identified scan buffers are identified by pointers and the step of retrieving selected ones of the scans from the corresponding uniquely identified scan buffers in a selected order comprises the steps of:

selecting pointers; and retrieving scans from the scan buffers identified by the selected pointers.

19. The method of claim 17 wherein the uniquely identified symbol buffers are identified by pointers and the step of retrieving selected ones of the symbols from the corresponding uniquely identified symbol buffers in a selected order comprises the steps of:

selecting pointers; and retrieving the symbols from the symbol buffers identified by the selected pointers.

* * * * *

UNITED STATES PATENT AND TRADEMARK OFFICE
CERTIFICATE OF CORRECTION

PATENT NO. : 5,548,108
DATED : August 20, 1996
INVENTOR(S) : Walt Moldskred et al.

It is certified that error appears in the above-indentified patent and that said Letters Patent is hereby corrected as shown below:

In column 12, line 60, claim 17, please delete "a" and insert therefor --an--.

Signed and Sealed this

Tenth Day of December, 1996

Attest:

BRUCE LEHMAN

*Attesting Officer*    *Commissioner of Patents and Trademarks*